US010309839B2

(12) United States Patent
Yoshida et al.

(10) Patent No.: US 10,309,839 B2
(45) Date of Patent: Jun. 4, 2019

(54) TEMPERATURE SENSOR

(71) Applicant: DENSO CORPORATION, Kariya, Aichi-pref. (JP)

(72) Inventors: Kouichi Yoshida, Kariya (JP); Shigeru Murata, Kariya (JP)

(73) Assignee: DENSO CORPORATION, Kariya (JP)

( * ) Notice: Subject to any disclaimer, the term of this patent is extended or adjusted under 35 U.S.C. 154(b) by 83 days.

(21) Appl. No.: 15/326,730

(22) PCT Filed: Jul. 1, 2015

(86) PCT No.: PCT/JP2015/068972
§ 371 (c)(1),
(2) Date: Jan. 17, 2017

(87) PCT Pub. No.: WO2016/009839
PCT Pub. Date: Jan. 21, 2016

(65) Prior Publication Data
US 2017/0205294 A1 Jul. 20, 2017

(30) Foreign Application Priority Data

Jul. 17, 2014 (JP) .................................. 2014-147128
Apr. 27, 2015 (JP) .................................. 2015-090822

(51) Int. Cl.
*G01K 7/02* (2006.01)
*G01K 1/08* (2006.01)
(52) U.S. Cl.
CPC ................. *G01K 7/02* (2013.01); *G01K 1/08* (2013.01); *G01K 2205/04* (2013.01)

(58) Field of Classification Search
CPC ............ G01K 7/02; G01K 13/02; G01K 1/08; G01K 1/14; G01K 13/00
(Continued)

(56) References Cited

U.S. PATENT DOCUMENTS 4,614,635 A * 9/1986 Terhune .................... G01T 3/04
250/390.01
4,724,428 A * 2/1988 Brown, Jr. ............. G01K 7/026
136/232
(Continued)

FOREIGN PATENT DOCUMENTS

CN 103926015 A 7/2014
JP 01-312432 12/1989
(Continued)

*Primary Examiner* — Gail Kaplan Verbitsky
(74) *Attorney, Agent, or Firm* — Nixon & Vanderhye P.C.

(57) ABSTRACT

A temperature sensor includes: a sheath tube; a pair of thermocouple wires inserted into the sheath tube; a temperature measuring junction of the pair of thermocouple wires; an insulating support disposed in the sheath tube; and a tip protective tube covering the outer periphery of a tip end of the sheath tube to surround the temperature measuring junction. The tip protective tube includes a base-end side tube portion and a tip-end side tube portion, the tip-end side tube portion having a diameter smaller than that of the base-end side tube portion. The tip-end side tube portion has a tip-end side portion filled with a first insulating filler in which the temperature measuring junction is buried. In the remaining part on the inside of the tip-end side tube portion, an air layer is formed.

12 Claims, 4 Drawing Sheets

(58) Field of Classification Search
USPC .......................................... 374/179, 163, 208
See application file for complete search history.

(56) References Cited

U.S. PATENT DOCUMENTS

| | | | | |
|---|---|---|---|---|
| 4,934,831 A * | 6/1990 | Volbrecht | ................. | G01K 1/08 |
| | | | | 29/612 |
| 5,520,461 A * | 5/1996 | Curry | ...................... | G01K 1/10 |
| | | | | 136/232 |
| 6,830,374 B1 * | 12/2004 | Gray | ........................ | G01K 7/02 |
| | | | | 136/230 |
| 7,771,116 B2 * | 8/2010 | Bowen | ..................... | G01K 7/06 |
| | | | | 374/179 |
| 7,982,580 B2 * | 7/2011 | Weber | ..................... | G01K 1/08 |
| | | | | 29/612 |
| 8,545,097 B2 * | 10/2013 | Bachmann | ............ | F01D 21/003 |
| | | | | 374/163 |
| 8,864,375 B2 * | 10/2014 | Abe | ........................ | G01K 1/08 |
| | | | | 374/144 |
| 2001/0002201 A1 | 5/2001 | Kita et al. | | |
| 2003/0028345 A1 * | 2/2003 | Watkins | ................. | G01K 7/026 |
| | | | | 702/130 |
| 2005/0265426 A1 | 12/2005 | Hanzawa | | |
| 2006/0013282 A1 * | 1/2006 | Hanzawa | ................. | G01K 1/08 |
| | | | | 374/163 |
| 2008/0205484 A1 | 8/2008 | Toudou | | |
| 2012/0282525 A1 | 11/2012 | Nagai et al. | | |
| 2013/0011331 A1 | 1/2013 | Nagai et al. | | |
| 2013/0302687 A1 | 11/2013 | Nagai et al. | | |
| 2014/0198826 A1 | 7/2014 | Adachi et al. | | |
| 2015/0231868 A1 | 8/2015 | Lantzsch | | |
| 2015/0247759 A1 | 9/2015 | Lantzsch | | |
| 2015/0276494 A1 | 10/2015 | Lantzsch | | |

FOREIGN PATENT DOCUMENTS

| | | |
|---|---|---|
| JP | 2001-165780 | 6/2001 |
| JP | 2005-055254 | 3/2005 |
| JP | 2009-075003 | 4/2009 |
| JP | 2009-92487 A | 4/2009 |
| JP | 2010-071735 | 4/2010 |
| JP | 2011-232332 | 11/2011 |
| JP | 2011-232332 A | 11/2011 |
| JP | 2012-052959 | 3/2012 |
| JP | 2012-52959 A | 3/2012 |

* cited by examiner

TEMPERATURE SENSOR

This application is the U.S. national phase of International Application No. PCT/JP2015/068972 filed Jul. 1, 2015 which designated the U.S. and claims priority from earlier Japanese Patent Applications No. 2014-147128 filed Jul. 17, 2014 and No. 2015-090822 filed Apr. 27, 2015, the entire contents of each of which are hereby incorporated by reference.

TECHNICAL FIELD

The present invention relates to a temperature sensor using a pair of thermocouple wires to measure temperature.

BACKGROUND ART

Temperature sensors that measure the temperature in the exhaust pipe of an engine may use a pair of thermocouple wires. Such a temperature sensor includes an exposed type temperature sensor, a grounded type temperature sensor and a non-grounded type temperature sensor. In the exposed type temperature sensor, a fluid (a fluid to be measured) whose temperature is measured is in a direct contact with a temperature measuring junction (a hot junction) formed by joining the tip ends of the pair of thermocouple wires to each other. In the grounded type temperature sensor, a temperature measuring junction is grounded to a sheath. In the non-grounded type temperature sensor, a temperature measuring junction is insulated from a sheath.

The exposed type temperature sensor is advantageous in that the responsiveness of measurement is good, but is disadvantageous in that the temperature measuring junction is easily damaged. The grounded type temperature sensor is advantageous in that the responsiveness of measurement is good, but is disadvantageous in that the sensor is prone to be affected by noise. The non-grounded type temperature sensor is advantageous in that the temperature measuring junction can be protected from damage and the sensor is not prone to be affected by noise, but is disadvantageous in that the responsiveness of measurement is degraded.

For example, Patent Literature 1 discloses a highly responsive thermocouple having a sheath, a pair of wires inserted into the sheath, and a domed protective cap attached to a tip-end portion of the sheath to cover the hot junction of the pair of wires. The domed protective cap has an intake hole formed on the top, and has an exhaust hole formed near the mounting portion of the cap. The domed protective cap prevents a gas current to be measured from directly colliding against the hot junction to thereby protect the hot junction from damage, and maintains high responsiveness of measurement.

CITATION LIST

Patent Literature

PTL 1: JP-A-2001-165780

SUMMARY OF THE INVENTION

Technical Problem

However, in the highly responsive thermocouple of PTL 1, the fluid to be measured (the gas current to be measured) introduced into the domed protective cap contacts the hot junction. Thus, in the case in which the fluid to be measured contains a corrosive gas, it is difficult for the highly responsive thermocouple of PTL 1 to protect the hot junction from corrosion. In the case in which an area, at which the temperature is measured, is under an environment that is prone to be affected by noise, the temperature measurement accuracy might be degraded by the highly responsive thermocouple of PTL 1.

The present invention has been made in view of the background set forth above, and has an object to provide a temperature sensor capable of protecting a temperature measuring junction from corrosion, and maintaining measurement accuracy, to improve the responsiveness of measurement.

Solution to Problem

An aspect of the present invention is a temperature sensor that includes: a sheath tube; a pair of thermocouple wires inserted into the sheath tube; a temperature measuring junction formed by joining tip ends of tip projecting portions of the pair of thermocouple wires projecting from the sheath tube; an insulating support disposed in a space in the sheath tube; and a tip protective tube which covers an outer periphery of a tip end of the sheath tube to surround the temperature measuring junction. In the temperature sensor, the tip protective tube includes a base-end side tube portion which covers the outer periphery of the tip end of the sheath tube, and a tip-end side tube portion formed at a position adjacent to a tip-end side of the base end side tube portion with a reduced diameter in comparison with the base-end side tube portion, and a tip end thereof is closed. A first insulating filler is filled in a tip-end side portion in the tip-end side tube portion, the first insulating filler burying the temperature measuring junction therein. In the tip-end side tube portion, an air layer is formed in a portion adjacent to a base end side of the first filler, or a second insulating filler is provided whose coefficient of thermal conductivity and density are lower than a coefficient of thermal conductivity and density of the first filler.

Advantageous Effects of the Invention

The temperature sensor is a non-grounded type temperature sensor, and has improved responsiveness, which is a weakness of a non-grounded type temperature sensor.

Specifically, the inside of the tip-end side tube portion of the tip protective tube is filled with the first insulating filler, in which the temperature measuring junction is buried. Thus, when the fluid to be measured contacts the tip protective tube, the heat of the fluid to be measured can be conducted to the temperature measuring junction through the tip protective tube and the first filler. The first filler can promote thermal conduction from the tip protective tube to the temperature measuring junction. The temperature measuring junction is surrounded by the tip protective tube and the first filler, and thus, in the case in which the fluid to be measured contains a corrosive gas, the temperature measuring junction can be protected from corrosion. The temperature measuring junction is surrounded by the tip protective tube and the first filler, and thus, in the case in which a site, at which the temperature is measured, is under an environment that is prone to be affected by noise, measurement accuracy can be maintained with temperature measurement being prevented from being affected by noise.

In the tip-end side tube portion, the air layer is formed in the portion adjacent to the base-end side of the first filler, or the second insulating filler is filled whose coefficient of thermal conductivity and density are lower than the coefficient of thermal conductivity and density of the first filler. Thus, heat dissipation from the tip protective tube to the sheath tube can be reduced by the second filler, whose coefficient of thermal conductivity and density are lower than the coefficient of thermal conductivity and density of the air layer or the first filler.

The density of the second filler is lower than the density of the first filler, and thus, when the slurry of the second filler is disposed above the slurry of the first filler in the tip-end side tube portion in the manufacture of the temperature sensor, the first and the second fillers cannot be easily mixed with each other. Accordingly, the manufacture of the temperature sensor using the first and the second fillers can be made easier.

With the promotion of thermal conduction by the first filler and a reduction in heat dissipation from the tip protective tube to the sheath tube, the responsiveness of the temperature sensor measuring temperatures can be improved.

Therefore, according to the temperature sensor, the temperature measuring junction is protected from corrosion, and measurement accuracy is maintained to improve the responsiveness of measurement.

In the temperature sensor, a configuration may be possible in which the tip-end side tube portion includes a middle step portion extending to the base-end side tube portion and a tip portion formed at a position adjacent to a tip-end side of the middle step portion, the tip portion having a diameter smaller than a diameter of the middle step portion, a tip end of the tip portion being blocked, and the temperature measuring junction is disposed in the tip portion.

The tip-end side tube portion includes the middle step portion and the tip portion, and thus, the tip portion and the middle step portion of the tip-end side tube portion can be disposed along the shape of the tip projecting portions of the pair of thermocouple wires extending from the temperature measuring junction to the inside of the sheath tube, the shape of which is widened from side to side. The distance between the temperature measuring junction and the tip portion can be appropriately shortened, the electrical insulation gap between the inner wall surface of the middle step portion and the pair of thermocouple wires can be appropriately maintained, and the insulation resistance of the temperature sensor can be enhanced.

A base-end surface of the first filler may be located in the middle step portion.

In the manufacture of the temperature sensor, the adjustment of the filled position of the filler to be filled in the tip protective tube is important to determine the ratio occupied by the filler and the air layer in the tip protective tube. The position of the base-end surface of the filler, which is determined by the filled position of the filler, is located at the position in the middle step portion having a diameter greater than the diameter of the tip portion. Thus, when the filled amount of the filler is varied, the positional displacement of the base-end surface of the filler can be reduced to a small amount. Accordingly, the adjustment of the ratio of the filler and the air layer occupied in the tip protective tube can be made easier.

DESCRIPTION OF EMBODIMENTS

In the following, embodiments of a temperature sensor will be described with reference to the drawings.

First Embodiment

Figure 1:
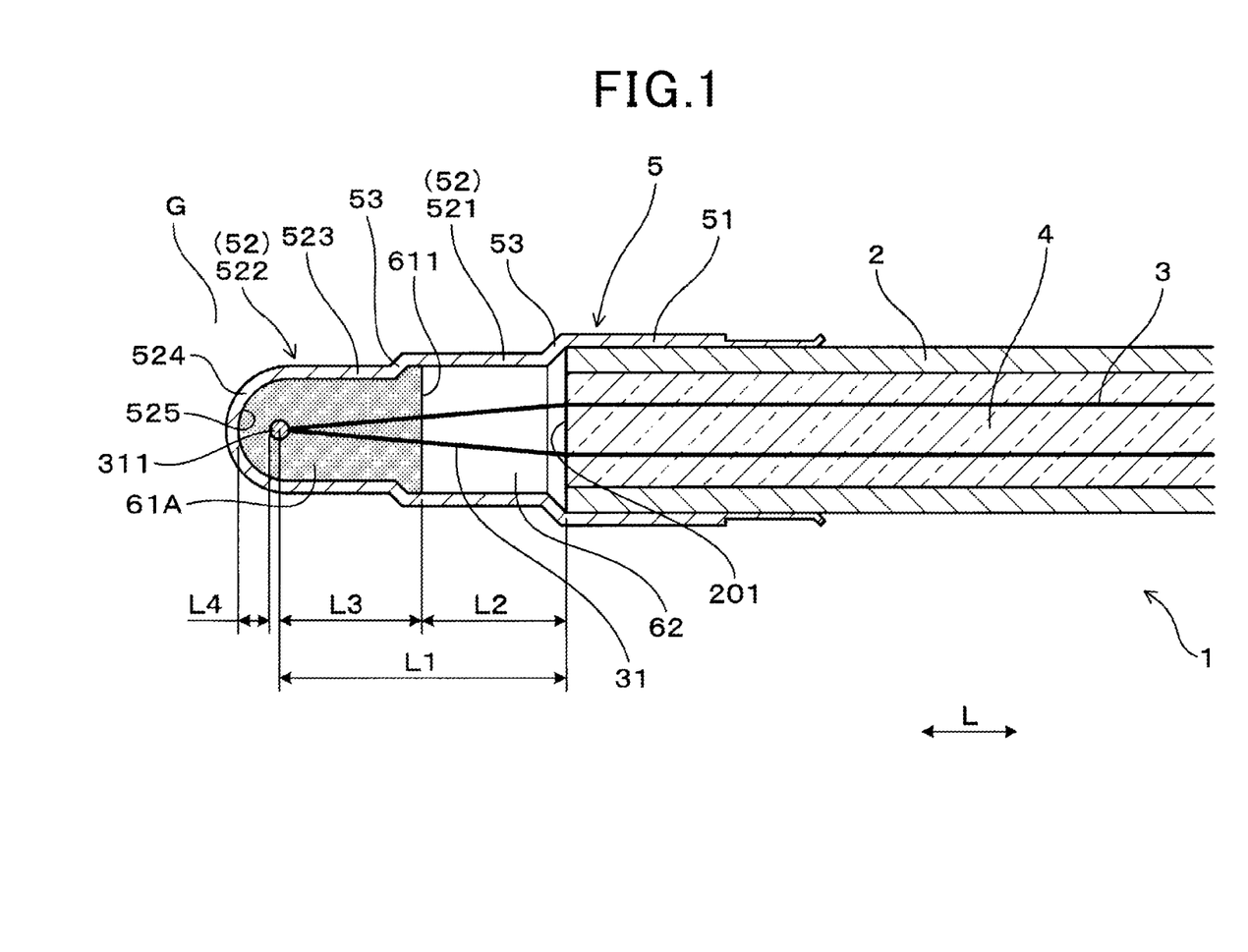
FIG. 1 is a cross-sectional view illustrating a temperature sensor, according to a first embodiment.

As shown in FIG. 1, a temperature sensor 1 of the present embodiment includes a sheath tube 2, a pair of thermocouple wires 3 inserted into the sheath tube 2, a temperature measuring junction 311 formed by joining the tip ends of tip projecting portions 31 to each other, the tip projecting portions 31 projecting from the sheath tube 2, an insulating support 4 disposed on the inside of the sheath tube 2, and a tip protective tube 5 which outer periphery of a tip end 201 of the sheath tube 2 to surround the temperature measuring junction 311. Note that, the left side of FIG. 1 is defined as a tip-end side, and the right side of FIG. 1 is defined as a base-end side.

The tip protective tube 5 has a base-end side tube portion 51 which covers the outer periphery of the tip end 201 of the sheath tube 2, and a tip-end side tube portion 52 formed at a position adjacent to the tip-end side of the base-end side tube portion 51 with a diameter smaller than that of the base end side tube portion 51 and with a closed tip end. The tip-end side tube portion 52 has a tip-end side portion filled with a first insulating filler 61A in which the temperature measuring junction 311 is buried, and has a remaining portion in which an air layer 62 is formed.

Referring to FIGS. 1 to 4, hereinafter will be described in detail the temperature sensor 1 of the present embodiment.

As shown in FIG. 1, the temperature sensor 1 of the present embodiment is used under a high temperature environment in which the operating temperature is not less than 500° C. The temperature sensor 1 is disposed in an exhaust pipe (not shown) through which an exhaust gas from the engine of an automobile is discharged, and is configured to measure the temperature of the exhaust gas in the exhaust pipe. A fluid G to be measured, which is a fluid whose temperature is measured by the temperature sensor 1, is an exhaust gas flowing in the exhaust pipe.

The sheath tube 2 and the tip protective tube 5 are made of an alloy containing Cr (chromium) and at least one of Ni (nickel) and Fe (iron). The content of Cr is 13 wt % or more relative to the entire sheath tube 2 or the entire tip protective tube 5. The support 4 is a member formed by compacting and solidifying an insulating powder, such as magnesium oxide, in the sheath tube 2.

One of the thermocouple wires 3 is made of nicrosil, which is an alloy containing Ni, Cr, Si (silicon), and the like, and the other of the thermocouple wires 3 is made of nisil, which is an alloy containing Ni, Si, and the like. The materials configuring the pair of thermocouple wires 3 are made compatible with the materials configuring the sheath tube 2 and the tip protective tube 5 as much as possible. Thus, the difference in linear expansion coefficient between these materials can be made smaller as small as possible.

Consequently, in the case where the temperature sensor 1 is used under an environment in which the temperature can be repeatedly changed, high reliability can be exerted. Use of the pair of thermocouple wires 3 made of nicrosil and nisil, enables the temperature sensor 1 to measure the temperature of an exhaust gas over as broad a range as possible.

As shown in FIG. 1, the tip-end side tube portion 52 of the present embodiment includes a middle step portion 521 connected to the base-end side tube portion 51, and a tip portion 522 formed at a position adjacent to the tip-end side of the middle step portion 521 and having a diameter smaller than that of the middle step portion 521. The tip protective tube 5 is formed such that the inner diameter is changed in three stages of the base-end side tube portion 51, the middle step portion 521, and the tip portion 522. The tip portion 522 has a tubular portion 523 and a hemispherical end portion 524 closing the tip end of the tubular portion 523. The outer diameter of the tubular portion 523 of the tip portion 522 is smaller than that of the sheath tube 2. An inclined step portion 53 is formed between the base-end side tube portion 51 and the middle step portion 521 and between the middle step portion 521 and the tubular portion 523 of the tip portion 522.

The pair of thermocouple wires 3 are disposed parallel with each other in the sheath tube 2 and the support 4. The tip projecting portions 31 of the pair of thermocouple wires 3 projecting out of the sheath tube 2 and the support 4 are inclined such that the gap between the tip projecting portions 31 is narrower toward the tip-end side. The temperature measuring junction 311 of the pair of thermocouple wires 3 formed by joining the tip ends of the tip projecting portions 31 to each other is disposed in the tip portion 522.

The tip protective tube 5 is configured by the base-end side tube portion 51, the middle step portion 521, and the tip portion 522. Thus, the tip portion 522 and the middle step portion 521 of the tip-end side tube portion 52 can be disposed in conformity with the shape of the tip projecting portion 31 of the pair of thermocouple wires 3 obliquely expanding from the temperature measuring junction 311 into the inside of the sheath tube 2.

More specifically, the base-end side portion of the tip projecting portion 31 of the pair of thermocouple wires 3 with a larger interval is disposed inside the middle step portion 521. The tip-end side portion of the tip projecting portion 31 of the pair of thermocouple wires 3 with a smaller interval is disposed inside the tubular portion 523 of the tip portion 522. The electrical insulation distance is appropriately maintained between the base-end side portion of the tip projecting portion 31 and the inner wall surface of the middle step portion 521, and between the tip-end side portion of the tip projecting portion 31 and the inner wall surface of the tubular portion 523 of the tip portion 522. Thus, the insulation resistance of the temperature sensor 1 can be enhanced. Thereby, in the case in which the temperature sensor 1 is used under an environment where electrical noise can be produced, the signal-to-noise ratio, that is a ratio of signal to noise, can be maintained at a high level.

Figure 2:
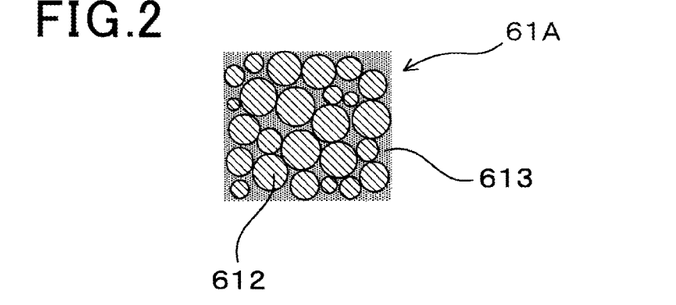
FIG. 2 is a diagram schematically illustrating a structure of a filler, according to the first embodiment.

As shown in FIG. 1, the first filler 61A filled in the tip-end side tube portion 52 is fully filled in the tip portion 522, and is partially filled in the middle step portion 521. A base-end surface (end surface on the base-end side) 611 of the first filler 61A is located on the inside of the middle step portion 521. As shown in FIG. 2, the first filler 61A is configured by particle particulate aggregates 612 made of ceramics and a glass layer 613 made of crystallized glass and filling the gaps between the particle aggregates 612. Materials that can be used for the particle aggregates 612 include a ceramics material of high thermal conductivity, such as AlN (aluminum nitride), $Al_2O_3$ (aluminum oxide), and SiN (silicon nitride).

In the absence of the first filler 61A, the air layer 62 is formed in the remaining part on the inside of the middle step portion 521 and in the inclined step portion 53 between the middle step portion 521 and the base-end side tube portion 51.

The temperature sensor 1 of the present embodiment is manufactured as follows.

Figure 3:
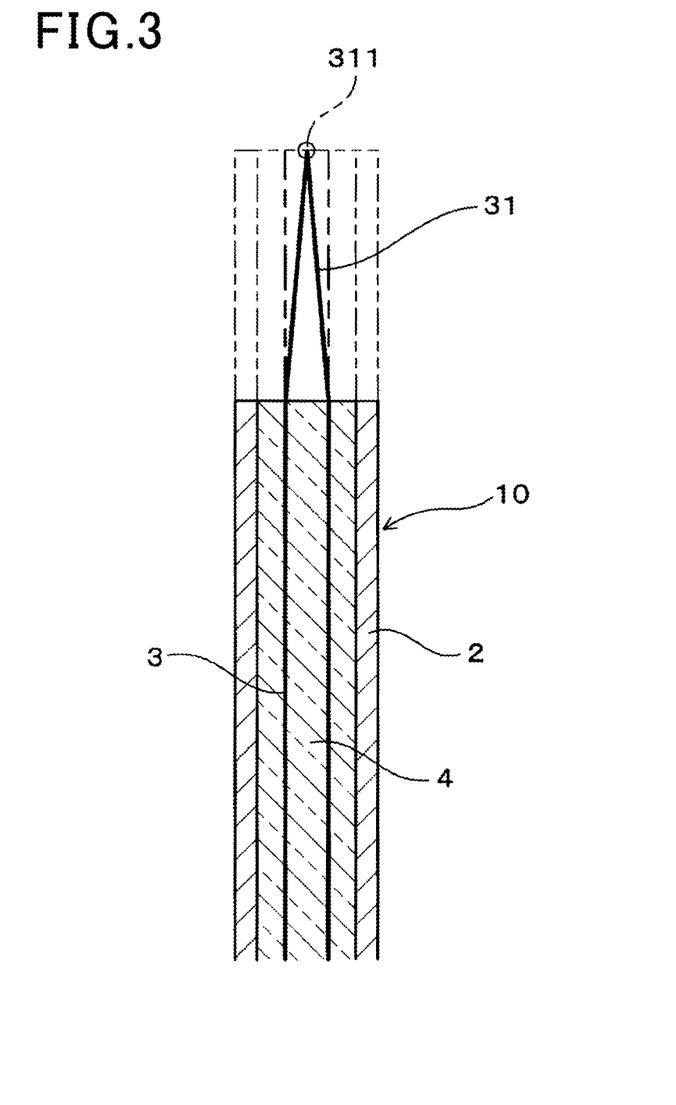
FIG. 3 is a cross-sectional view illustrating a tube body in which a pair of thermocouple wires are supported in a sheath tube, according to the first embodiment.

First, as shown in FIG. 3, the pair of thermocouple wires 3 and the insulating powder material to serve as the support 4 are disposed in the sheath tube 2, and the sheath tube 2 is decreased in diameter to compact the powder material. Then, a tube body 10 is formed, in which the pair of thermocouple wires 3 are supported on the inside of the sheath tube 2 by the support 4. Subsequently, the portions of the sheath tube 2 and the support 4 located in the tip end portion of the tube body 10 are removed to expose the tip projecting portion 31 of the pair of thermocouple wires 3. The tip ends of the tip projecting portion 31 are laser-welded to each other to form the temperature measuring junction 311.

Figure 4:
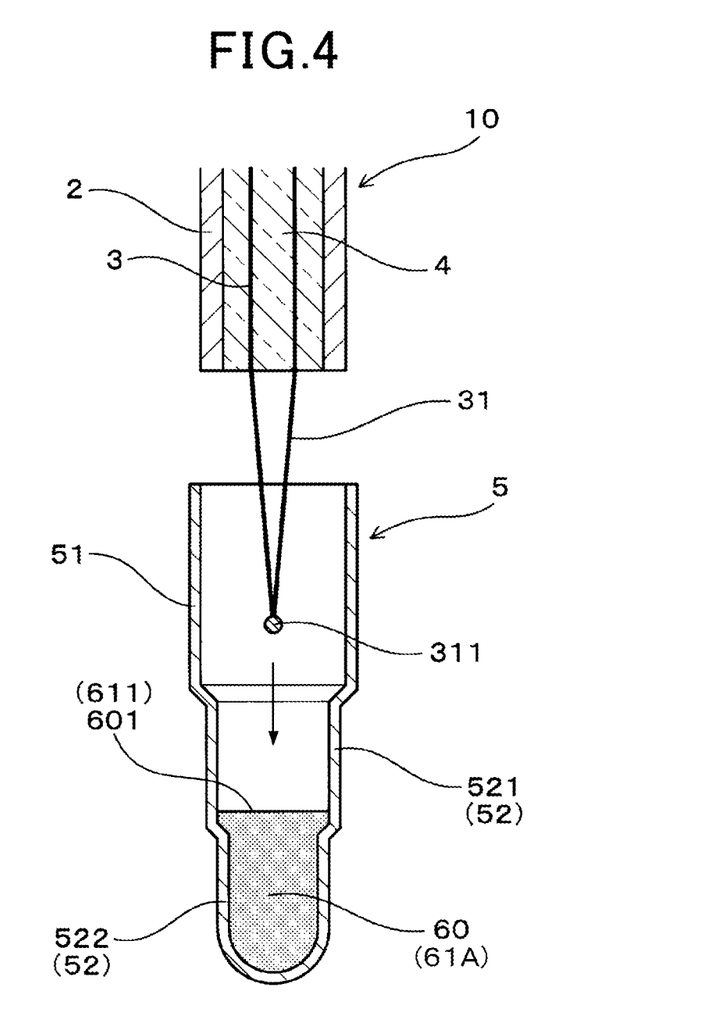
FIG. 4 is a cross-sectional view illustrating a state in which the base-end side tube portion of a tip protective tube is being externally mounted to a sheath tube, according to the first embodiment.

On the other hand, as shown in FIG. 4, slurry 60 containing ceramics powder to serve as the particle aggregates 612 and a crystallized glass material to serve as the glass layer 613 in a solvent is injected into the tip protective tube 5 with a syringe. In the injection, fluidity of the ceramics powder and the crystallized glass material is improved by the solvent, thereby sufficiently spreading the slurry 60 to the tip portion 522 and a part of the middle step portion 521 of the tip protective tube 5.

Subsequently, as shown in FIG. 4, the base-end side tube portion 51 of the tip protective tube 5 is externally mounted to the tube body 10 (sheath tube 2), while the temperature measuring junction 311 of the pair of thermocouple wires 3 is immersed in the slurry 60 in the tip protective tube 5. Then, the tip protective tube 5 is treated at high temperature. Thus, the first filler 61A is formed in the tip protective tube 5 in which the gaps between the particle aggregates 612 made of ceramics powder are filled with the glass layer 613 made of a crystallized glass material. In the tip protective tube 5, the portion without being filled with the first filler 61A is formed with the air layer 62 in which the tip projecting portions 31 of the pair of thermocouple wires 3 are disposed.

The injection amount of the slurry 60 into the tip protective tube 5 is determined so that a liquid level 601 of the slurry 60 is located in the middle step portion 521. At this time, the position of the base-end surface 611 of the first filler 61A, which is determined by the filled position of the slurry 60, is in the middle step portion 521 having a diameter greater than the diameter of the tip portion 522. Thus, when the filled amount of the first filler 61A is varied, the positional displacement of the base-end surface 611 of the first filler 61A (positional displacement in an axial direction L in which the sheath tube 2 extends) can be minimized. In other words, the cross sectional area on the inside of the middle step portion 521 is made greater than the cross sectional area of the inside of the tip portion 522. Thus, the influence of the error in the volume of the slurry 60 on the positional change in the liquid level 601 of the slurry 60, is smaller in the middle step portion 521 than in the tip portion 522. Therefore, the liquid level 601 of the slurry 60 that is located in the middle step portion 521 enables easy adjustment of the occupying ratio of the first filler 61A and the air layer 62 in the tip protective tube 5.

The position of the base-end surface 611 of the first filler 61A influences a length L2 of the air layer 62 in the axial direction L and a burying depth L3 of the temperature measuring junction 311 into the first filler 61A, described later, and thus influences the effect of reducing heat dissipation from the tip protective tube 5 to the sheath tube 2, and the effect of reducing the breakage of the tip projecting portion 31 of the pair of thermocouple wires 3, and also influences the responsiveness of the temperature sensor 1, and the like. Consequently, appropriate adjustment of the position of the base-end surface 611 of the first filler 61A can appropriately achieve these effects. Further, appropriate adjustment of the position of the base-end surface 611 of the first filler 61A can minimize variations in the responsiveness of the individual temperature sensors 1.

Since the slurry 60 is injected into the tip protective tube 5, followed by drying to form the first filler 61A, the density of the first filler 61A can be increased, and insulation resistance of the first filler 61A can be improved.

Further, the positional relationship between the tip projecting portions 31 of the pair of thermocouple wires 3 and the tip protective tube 5 is determined as follows.

In the axial direction L in which the sheath tube 2 extends, a distance L1 from the tip end 201 of the sheath tube 2 to the center of the temperature measuring junction 311 is in a range of 5 to 15 mm. With the distance L1 being 5 mm or more, a sufficient length is ensured for the tip-end side tube portion 52, and the influence of heat dissipation (thermal conduction) from the tip protective tube 5 to the sheath tube 2 is reduced to maintain the responsiveness of the temperature sensor 1. On the other hand, with the distance L1 exceeding 15 mm, the tip projecting portion 31 of the pair of thermocouple wires 3 is easily broken when external force is applied to the temperature sensor 1.

The distance L2 from the tip end 201 of the sheath tube 2 to the base-end surface 611 of the first filler 61A in the axial direction L (the length L2 of the air layer 62 in the axial direction L) is in a range of 1 to 5 mm. When the distance L2 is less than 1 mm, the effect of heat insulation exerted by the air layer 62 (the effect of reducing heat dissipation) is reduced. On the other hand, when the distance L2 exceeds 5 mm, the length in which the pair of thermocouple wires 3 are not fixed by the first filler 61A becomes large, and the tip projecting portion 31 of the pair of thermocouple wires 3 is easily broken when external force is applied to the temperature sensor 1.

The distance L3 from the base-end surface 611 of the first filler 61A to the center of the temperature measuring junction 311 in the axial direction L (the burying depth L3 of the temperature measuring junction 311 into the first filler 61A) is in a range of 1 to 10 mm. When the distance L3 is less than 1 mm, the temperature measuring junction 311 might be hampered from receiving heat of the fluid G to be measured present on the outside of the tip protective tube 5, resulting in the risk of degrading the responsiveness of the temperature sensor 1. On the other hand, when the distance L3 exceeds 10 mm, the responsiveness of the temperature sensor 1 is degraded, because of the increase in the heat capacity of the tip-end side tube portion 52 filled with the first filler 61A and because of the heat dissipation (thermal conduction) from the tip protective tube 5 to the sheath tube 2.

A distance L4 from the tip end of the temperature measuring junction 311 to an inner tip end 525 of the tip portion 522 in the axial direction L is in a range of 0.1 to 2 mm.

Thus, the electrical insulation distance from the inner wall surface of the tip portion 522 to the temperature measuring junction 311 can be appropriately maintained.

The temperature sensor 1 of the present embodiment is the non-grounded type temperature sensor 1, and is improved in responsiveness, which is the weak point of the non-grounded type temperature sensor 1.

Specifically, the interior of the tip portion 522 and a part of the interior of the middle step portion 521 of the tip protective tube 5 are filled with the first insulating filler 61A, in which the temperature measuring junction 311 is buried. Thus, when the fluid G to be measured contacts the tip protective tube 5, the heat of the fluid G to be measured can be transferred to the temperature measuring junction 311 through the tip protective tube 5 and the first filler 61A. Then, the first filler 61A can promote the thermal conduction from the tip protective tube 5 to the temperature measuring junction 311. Further, the temperature measuring junction 311 is surrounded by the tip protective tube 5 and the first filler 61A. Consequently, in the case in which the fluid G to be measured contains a corrosive gas, the temperature measuring junction 311 can be protected from corrosion. In addition, the temperature measuring junction 311 is surrounded by the tip protective tube 5 and the first filler 61A. Accordingly, in the case in which an area, at which the temperature is measured, is under an environment that is prone to be affected by noise, measurement accuracy can be maintained with temperature measurement being prevented from being affected by noise.

When the temperature sensor 1 is used for measuring the temperature of the exhaust gas exhausted from the engine of the automobile, the temperature sensor 1 is repeatedly heated and cooled in cooling and heating cycles in association with the combustion of the engine. The pair of thermocouple wires 3 are made of metal materials whose linear expansion coefficients are different from each other. Thus, the pair of thermocouple wires 3 might be deformed during the cooling and heating cycles due to the difference in the linear expansion coefficients.

Therefore, a part of the thermocouple wires 3 and the temperature measuring junction 311 at the tip ends of the thermocouple wires 3 are buried in the first filler 61A. Thus, the thermocouple wires 3 can be prevented from being easily deformed. Consequently, the thermocouple wires 3 and the temperature measuring junction 311 can be protected from deformation.

Further, the air layer 62 is formed in the middle step portion 521 of the tip protective tube 5. Thus, heat dissipation from the tip protective tube 5 to the sheath tube 2 can be reduced by the air layer 62. The air layer 62 can improve the thermal insulation between the tip protective tube 5 and the sheath tube 2. Accordingly, with the promotion of thermal conduction by the first filler 61A and the reduction in heat dissipation from the tip protective tube 5 to the sheath tube 2, the responsiveness of the temperature sensor 1 measuring temperature can be improved.

Therefore, according to the temperature sensor 1 of the present embodiment, the temperature measuring junction 311 is protected from corrosion, and measurement accuracy is maintained, to improve resistance to electrical noise and the responsiveness of measurement.

Second Embodiment

Note that, in a second embodiment, components configured similarly to ones in the first embodiment are designated with the same reference signs indicating that the components are regarded to have similar advantageous effects, and duplicate description is omitted.

Figure 5:
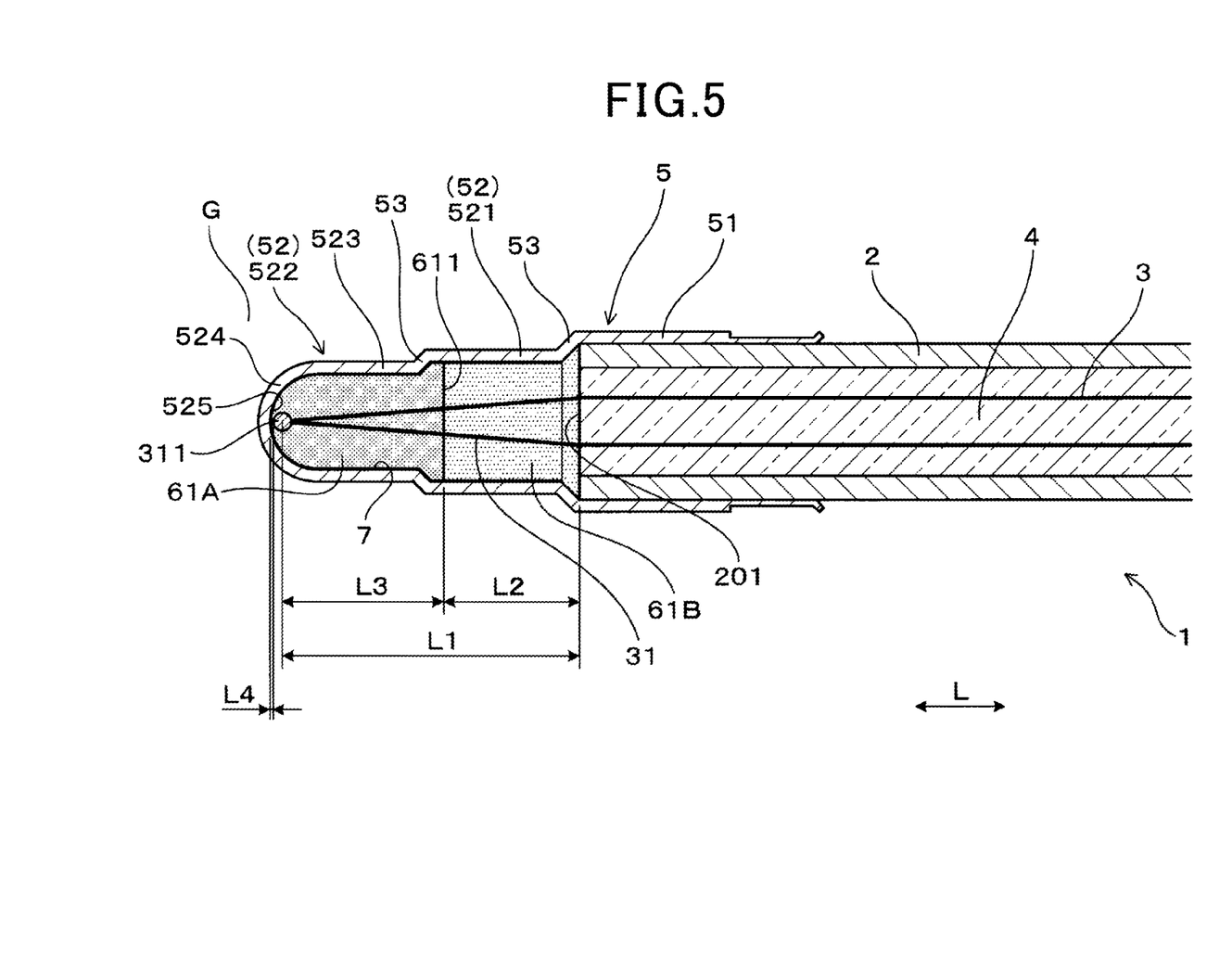
FIG. 5 is a cross-sectional view illustrating a temperature sensor, according to a second embodiment.

The present embodiment is an example of a temperature sensor 1 in which a second filler 61B is filled in a portion adjacent to the base end side of a first filler 61A on the inside of a tip end side tube portion 52. The second filler 61B has a thermal conductivity and a density lower than those of the first filler 61A.

As shown in FIG. 5, in the temperature sensor 1 of the present embodiment, two types of fillers 61A and 61B having different thermal conductivities and different densities are filled on the inside of the tip end side tube portion 52. A temperature measuring junction 311 of thermocouple wires 3 is buried in the first filler 61A filled in the tip-end side portion of the tip end side tube portion 52.

The composition of the first filler 61A is the same as that described in the first embodiment. The composition of the second filler 61B contains particle aggregates 612 and a glass layer 613, which is the same as in the composition of the first filler 61A. However, the type of the particle aggregates 612 is different from the case of the first filler 61A. Materials that can be used for the particle aggregates 612 of the second filler 61B include ceramics materials, such as cordierite, steatite, and forsterite having thermal conductivity and density lower than those of AlN, $Al_2O_3$, SiN, and the like.

As shown in FIG. 5, the inner surface of the tip-end side tube portion 52 is entirely coated with an insulating material 7 for securing the insulation between the tip-end side tube portion 52 and the temperature measuring junction 311. The insulating material 7 secures the insulation of the temperature measuring junction 311 from the tip-end side tube portion 52. Thus, the temperature measuring junction 311 can be disposed as close as possible to an inner tip end 525 of a tip portion 522 of the tip-end side tube portion 52. Specifically, the distance L4 from the tip end of the temperature measuring junction 311 to the inner tip end 525 of the tip portion 522 of the tip-end side tube portion 52 is designed to be 0.1 mm or less. The distance L4 may be 0 mm which, however, is difficult because the slurry configuring the first filler 61A penetrates between the temperature measuring junction 311 and the inner tip end 525.

In the tip-end side tube portion 52 of a tip protective tube 5 according to the present embodiment, the second filler 61B is filled on the base-end side of the first filler 61A. Thus, heat dissipation from the tip protective tube 5 to the sheath tube 2 can be reduced by the second filler 61B whose thermal conductivity is lower than that of the first filler 61A.

The density of the second filler 61B is lower than the density of the first filler 61A. Thus, when the slurry of the second filler 61B is disposed above the slurry of the first filler 61A on the inside of the tip end side tube portion 52 in the manufacture of the temperature sensor 1, the first and the second fillers 61A and 61B are unlikely to be mixed with each other. This configuration can facilitate manufacture of the temperature sensor 1 using the first and the second fillers 61A and 61B.

(Confirmatory Test)

In the present confirmatory test, appropriate ranges of distances L1, L2 and L4 in the axial direction L in which the sheath tube 2 extends were confirmed, where the distance L1 (mm) was from the tip end 201 of the sheath tube 2 to the center of the temperature measuring junction 311, the distance L2 (mm) was from the tip end 201 of the sheath tube 2 to the base end face 611 of the first filler 61A, and the distance L4 was (mm) from the tip end of the temperature measuring junction 311 to the inner tip end 525 of the tip portion 522.

In confirming the appropriate ranges of the distances L1 to L3, 63%-response time (s) of the temperature sensor 1 was confirmed. In confirming the appropriate ranges of the distances L1 and L2, it was confirmed whether vibrations generated in the temperature sensor 1 were within an allowable range when the temperature sensor 1 was vibrated at an acceleration of 40 G (392 m/s$^2$). In confirming the appropriate range of the distance L4, the insulation resistance (MΩ) between the temperature measuring junction 311 of the thermocouple wires 3 and the tip protective tube 5 was confirmed.

(Distance L1)

In regards to the distance L1, the results of the 63%-response time test and the vibration test are shown in Table 1. It should be noted that the distance L2 was set to a constant value in a range of 1 to 5 mm, the distance L3 was set to a constant value in a range of 1 to 10 mm, and the distance L4 was set to a constant value in a range of 0.1 to 2 mm.

TABLE 1

| L1 (mm) | Response time (s) | Vibration test |
| --- | --- | --- |
| 4 | 4.0 | Good |
| 5 | 3.8 | Good |
| 6 | 3.8 | Good |
| 10 | 3.8 | Good |
| 11 | 3.8 | Good |
| 15 | 3.8 | Good |
| 20 | 3.8 | Poor |

As shown in Table 1, when the distance L1 was in a range of 5 to 15 mm, it was revealed that 63%-response time was as fast as 3.8 (s), the evaluation of the vibration test was "good", and vibrations generated in the temperature sensor 1 were within an allowable range. On the other hand, it was revealed that when the distance L1 was 4 mm, 63%-response time was 4.0 s, and the responsiveness of the temperature sensor 1 was slightly poor. It was revealed that when the distance L1 was 16 mm and 20 mm, the evaluation of the vibration test was "poor", and vibrations generated in the temperature sensor 1 exceeded an allowable range. These results revealed that when the distance L1 (mm) from the tip end 201 of the sheath tube 2 to the center of the temperature measuring junction 311 was set in a range of 5 to 15 mm, the responsiveness and vibration proof of the temperature sensor 1 were very good.

(Distance L2)

In regards to the distance L2, the results of the 63%-response time test and the vibration test are shown in Table 2. It should be noted that the distance L1 was set to a constant value in a range of 5 to 15 mm, the distance L3 was set to a constant value in a range of 1 to 10 mm, and the distance L4 was set to a constant value in a range of 0.1 to 2 mm.

TABLE 2

| L2 (mm) | Response time (s) | Vibration test |
| --- | --- | --- |
| 0.5 | 3.9 | Good |
| 1 | 3.8 | Good |
| 1.5 | 3.8 | Good |
| 3 | 3.8 | Good |
| 4.5 | 3.8 | Good |

TABLE 2-continued

| L2 (mm) | Response time (s) | Vibration test |
|---|---|---|
| 5 | 3.8 | Good |
| 6 | 3.8 | Poor |

As shown in Table 2, it was revealed that when the distance L2 was in a range of 1 to 5 mm, 63%-response time was as fast as 3.8 (s), the evaluation of the vibration test was "good", and vibrations generated in the temperature sensor 1 were within an allowable range. On the other hand, it was revealed that when the distance L2 was 0.5 mm, 63%-response time was 3.9 s, and the responsiveness of the temperature sensor 1 was less satisfactory. It was revealed that when the distance L2 was 6 mm, the evaluation of the vibration test was "poor", and vibrations generated in the temperature sensor 1 exceeded an allowable range. These results revealed that when the distance L2 (mm) from the tip end 201 of the sheath tube 2 to the base end face 611 of the first filler 61A was set in a range of 1 to 5 mm, the responsiveness and vibration proof of the temperature sensor 1 were very good.

(Distance L4)

In regards to the distance L4, the results of the 63%-response time test and the insulation resistance test are shown in Table 3. It should be noted that the distance L1 was set to a constant value in a range of 5 to 15 mm, the distance L2 was set to a constant value in a range of 1 to 5 mm, and the distance L3 was set to a constant value in a range of 1 to 10 mm.

TABLE 3

| L4 (mm) | Response time (s) | Insulation resistance (MΩ) |
|---|---|---|
| 0 | 3.6 | 0 |
| 0.1 | 3.8 | 10 |
| 0.5 | 3.8 | 15 |
| 1 | 3.8 | 100 or more |
| 2 | 3.8 | 100 or more |
| 3 | 4.0 | 100 or more |

As shown in Table 3, it was revealed that when the distance L4 was in a range of 0.1 to 2 mm, 63%-response time was as fast as 3.8 (s), the insulation resistance was 10 MΩ or more, and the insulation of the temperature measuring junction 311 was very good. On the other hand, it was revealed that when the distance L4 was 0 mm, the insulation resistance was 0Ω, and the insulation of the temperature measuring junction 311 was poor. It was revealed that when the distance L4 was 3 mm, 63%-response time was 4.0 s, and the responsiveness of the temperature sensor 1 was slightly poor. These results revealed that when the distance L4 from the tip end of the temperature measuring junction 311 to the inner tip end 525 of the tip portion 522 was set in a range of 0.1 to 2 mm, the responsiveness and insulation of the temperature sensor 1 were very good.

REFERENCE SIGNS LIST

1 Temperature sensor
2 Sheath tube
3 Thermocouple wire
31 Tip projecting portion
311 Temperature measuring junction
4 Support
5 Tip protective tube
51 Base-end side tube portion
52 Tip-end side tube portion
61A First filler
61B Second filler
62 Air layer

The invention claimed is:

1. A temperature sensor comprises:
a sheath tube;
a pair of thermocouple wires inserted into the sheath tube;
a temperature measuring junction formed by joining tip ends of a tip projecting portion of the pair of thermocouple wires with each other, the tip projecting portion being projected from the sheath tube;
an insulating support disposed in the sheath tube; and
a tip protective tube that covers an outer periphery of a tip-end of the sheath tube to surround the temperature measuring junction, wherein,
the tip protective tube includes
a base-end side tube portion that covers the outer periphery of the tip end of the sheath tube, and
a tip end-side tube portion formed at a position adjacent to a tip-end side of the base-end side tube portion, the tip-end side tube portion having a diameter smaller than a diameter of the base-end side tube portion, a tip end of the tip-end side tube portion being closed;
the tip-end side tube portion has a tip-end side portion filled with a first insulating filler, the first insulating filler burying the temperature measuring junction therein; and
the tip-end side tube portion has a portion adjacent to a base-end side of the first filler, the portion being formed with an air layer.

2. The temperature sensor according to claim 1, wherein,
the tip-end side tube portion includes
a middle step portion connected to the base-end side tube portion, and
a tip portion formed at a position adjacent to a tip-end side of the middle step portion, the tip portion having a diameter smaller than a diameter of the middle step portion, the tip portion having a closed tip end; and
the temperature measuring junction is disposed inside the tip portion.

3. The temperature sensor according to claim 2, wherein,
a base-end surface of the first filler is located inside the middle step portion.

4. The temperature sensor according to claim 1, wherein,
a distance from the tip end of the sheath tube to a center of the temperature measuring junction is in a range of 5 to 15 mm;
a distance from the tip end of the sheath tube to the base-end surface of the first filler is in a range of 1 to 5 mm; and
a distance from the base end surface of the first filler to the center of the temperature measuring junction is in a range of 1 to 10 mm.

5. The temperature sensor according to claim 2, wherein,
a distance from the tip end of the sheath tube to a center of the temperature measuring junction is in a range of 5 to 15 mm;
a distance from the tip end of the sheath tube to the base-end surface of the first filler is in a range of 1 to 5 mm; and
a distance from the base end surface of the first filler to the center of the temperature measuring junction is in a range of 1 to 10 mm.

6. The temperature sensor according to claim 3, wherein,
a distance from the tip end of the sheath tube to a center of the temperature measuring junction is in a range of 5 to 15 mm;
a distance from the tip end of the sheath tube to the base-end surface of the first filler is in a range of 1 to 5 mm; and
a distance from the base end surface of the first filler to the center of the temperature measuring junction is in a range of 1 to 10 mm.

7. The temperature sensor according to claim 2, wherein,
the tip-end side tube portion has an inner surface coated with an insulating material; and
a distance from a tip end of the temperature measuring junction to an inner tip end of the tip portion of the tip-end side tube portion is 0.1 mm or less.

8. The temperature sensor according to claim 3, wherein,
the tip-end side tube portion has an inner surface coated with an insulating material; and
a distance from a tip end of the temperature measuring junction to an inner tip end of the tip portion of the tip-end side tube portion is 0.1 mm or less.

9. The temperature sensor according to claim 1, wherein,
the first filler and the second filler are configured by
particle aggregates made of ceramics, and
a glass layer made of crystallized glass filling gaps between the particle aggregates.

10. The temperature sensor according to claim 1, wherein:
a length of the air layer, extending from the tip end of the sheath tube to a base-end surface of the first filler in an axial direction of the air layer, is in a range of 1 to 5 mm.

11. The temperature sensor according to claim 2, wherein:
the air layer is arranged inside the middle step portion, the middle step portion having a diameter smaller than that of the base-end side tube portion.

12. The temperature sensor according to claim 11, wherein:
the air layer is further arranged in an inclined step portion between the middle step portion and the base-end side tube portion.

* * * * *